United States Patent
Chablani et al.

(10) Patent No.: US 9,736,243 B2
(45) Date of Patent: Aug. 15, 2017

(54) MULTIPLE TRANSACTION LOGS IN A DISTRIBUTED STORAGE SYSTEM

(71) Applicant: MICROSOFT TECHNOLOGY LICENSING, LLC, Redmond, WA (US)

(72) Inventors: Manish Chablani, Redmond, WA (US); Jegan Devaraju, Redmond, WA (US); Yikang Xu, Redmond, WA (US); Muhammad Junaid Shahid, Redmond, WA (US); Andrew James Edwards, Bellevue, WA (US); Bradley G. Calder, Bellevue, WA (US); Ju Wang, Redmond, WA (US); Aaron W. Ogus, Redmond, WA (US); Shane Mainali, Redmond, WA (US); Krishnan Varadarajan, Redmond, WA (US); Pradeep Seela, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 183 days.

(21) Appl. No.: 14/569,582

(22) Filed: Dec. 12, 2014

(65) Prior Publication Data
US 2016/0173599 A1   Jun. 16, 2016

(51) Int. Cl.
*G06F 15/16* (2006.01)
*H04L 29/08* (2006.01)
(Continued)

(52) U.S. Cl.
CPC ............ *H04L 67/1097* (2013.01); *G06F 3/06* (2013.01); *G06F 11/1471* (2013.01);
(Continued)

(58) Field of Classification Search
None
See application file for complete search history.

(56) References Cited

U.S. PATENT DOCUMENTS 7,725,428 B1   5/2010   Hawkins et al.
7,831,574 B2   11/2010  Pareek et al.
(Continued)

OTHER PUBLICATIONS

"International Search Report and Written Opinion Issued in PCT Application No. PCT/US2015/065222", Mailed Date: Jul. 8, 2016, 21 Pages.
(Continued)

*Primary Examiner* — Umar Cheema
*Assistant Examiner* — Hannah S Wang
(74) *Attorney, Agent, or Firm* — Shook, Hardy & Bacon L.L.P.

(57) ABSTRACT

In various embodiments, methods and systems for implementing multiple transaction logs in a distributed storage system are provided. A log stream component detects performance metrics of a plurality of log streams. The performance metrics are associated with requests from partitions in the distributed storage system. A transaction component receives a request to execute a transaction using a log stream. The request is received from a partition of the distributed storage system. The performance metrics of the plurality of log streams can be referenced, where the performance metrics indicate a performance capacity of a selected log stream to process the request. A log stream for executing the transaction is determined based on the performance capacity. The log stream selected can also factor request attributes of the request. The transaction component communicates the request to be executed, using the log stream to perform the transaction.

20 Claims, 7 Drawing Sheets

(51) Int. Cl.
  *G06F 3/06* (2006.01)
  *G06F 11/34* (2006.01)
  *G06F 17/30* (2006.01)
  *G06F 11/14* (2006.01)

(52) U.S. Cl.
  CPC ...... *G06F 11/3433* (2013.01); *G06F 11/3485* (2013.01); *G06F 17/30* (2013.01); *G06F 2201/87* (2013.01)

(56) References Cited

U.S. PATENT DOCUMENTS

| | | | |
|---|---|---|---|
| 8,090,691 | B2 | 1/2012 | Lynn |
| 8,190,588 | B1 | 5/2012 | Gupta et al. |
| 8,769,350 | B1 | 7/2014 | Ro et al. |
| 8,838,534 | B2 | 9/2014 | Fowler |
| 2006/0218206 | A1 | 9/2006 | Bourbonnais et al. |
| 2009/0249001 | A1 | 10/2009 | Narayanan et al. |
| 2010/0106695 | A1 | 4/2010 | Calder et al. |
| 2010/0106734 | A1* | 4/2010 | Calder ............. G06F 17/30011 707/758 |
| 2010/0333111 | A1* | 12/2010 | Kothamasu ......... H04L 12/5855 719/313 |
| 2012/0109895 | A1* | 5/2012 | Zwilling ............. G06F 11/1471 707/648 |
| 2012/0221373 | A1* | 8/2012 | Marwah ....................... 705/7.27 |
| 2013/0042156 | A1 | 2/2013 | Srinivasan et al. |
| 2014/0019495 | A1 | 1/2014 | Borthakur et al. |
| 2014/0172944 | A1* | 6/2014 | Newton ................ H04L 67/289 709/202 |
| 2014/0279917 | A1 | 9/2014 | Minh et al. |
| 2014/0351527 | A1* | 11/2014 | Traut ...................... G06F 3/061 711/154 |
| 2015/0227598 | A1* | 8/2015 | Hahn .................. G06F 17/3007 707/722 |
| 2016/0092259 | A1* | 3/2016 | Mehta ................. G06F 9/45558 718/1 |

OTHER PUBLICATIONS

Alder, et al., "Windows Azure Storage: A Highly Available Cloud Storage Service with Strong Consistency", In Proceedings of the Twenty-Third ACM Symposium on Operating Systems Principles, Oct. 23, 2011, pp. 143-157.

Kejser, Thomas, "Adding Another Transaction Log File to Gain Performance", Published on: Jul. 6, 2014 Available at: http://kejser.org/adding-another-transaction-log-file-to-gain-performance/.

Rao, et al., "Using Paxos to Build a Scalable, Consistent, and Highly Available Datastore", In Proceedings of the VLDB Endowment, vol. 4, No. 4, Jan. 1, 2011, 12 pages.

"Multiple Transaction Log files and performance impact", Retrieved on: Nov. 12, 2014, Available at: http://dba.stackexchange.com/questions/62344/multiple-transaction-log-files-and-performance-impact.

"Transaction Processing: Concepts and Techniques", Published on: Apr. 2007, Available at: http://www.availabilitydigest.com/private/0204/transaction_processing_Gray.pdf.

Chang, et al., "Bigtable: A Distributed Storage System for Structured Data", In Proceedings of Seventh Symposium on Operating System Design and Implementation, Nov. 2006, 14 pages.

"International Preliminary Report on Patentability Issued in PCT Application No. PCT/US2015/065222", Mailed Date: Oct. 11, 2016, 6 Pages.

"Second Written Opinion Issued in PCT Application No. PCT/US2015/065222", Mailed Date: Aug. 22, 2016, 7 Pages.

* cited by examiner

MULTIPLE TRANSACTION LOGS IN A DISTRIBUTED STORAGE SYSTEM

BACKGROUND

A distributed storage system can support several different types of applications, from social networking to managing medical records. The distributed storage system can specifically be implemented with user files, structured storage, and message delivery in order to support storage and workflow of the applications. Specifically, a distributed storage system can be configured to receive requests to perform transactions that facilitate the storage and workflow of the applications. As such, the capacity of the distributed storage system to handle high volumes of transactions can be critical to the overall performance of the distributed storage system.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments described herein are directed to methods, systems, and computer storage media for implementing multiple transaction logs in a distributed storage system. A log stream component detects performance metrics of a plurality of log streams. The performance metrics are associated with requests from partitions in the distributed storage system. A transaction component receives a request to execute a transaction using a log stream. The request is received from a partition of the distributed storage system. The performance metrics of the plurality of log streams can be referenced, where the performance metrics indicate a performance capacity of a selected log stream to process the request. A log stream for executing the transaction is determined based on the performance capacity. The log stream can further be determined based on request attributes of the request. The transaction component communicates the request to be executed, using the log stream to perform the transaction.

BRIEF DESCRIPTION OF THE DRAWINGS

The present invention is described in detail below with reference to the attached drawing figures, wherein.

DETAILED DESCRIPTION

Figure 1:
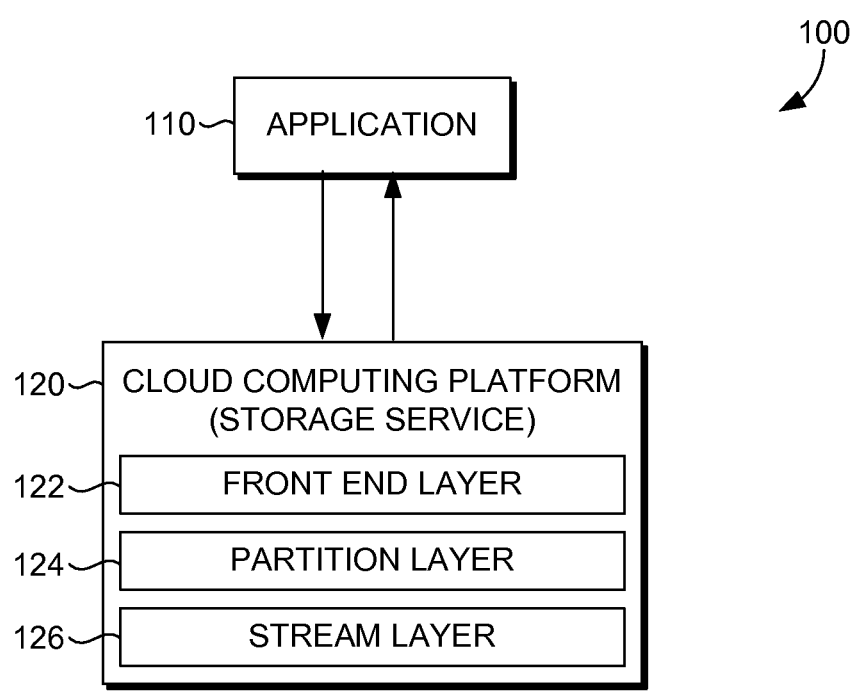
FIG. 1 is a block diagram of an exemplary distributed storage system in which embodiments described herein may be employed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the requirement of "a feature" is satisfied where one or more features are present. Also, the term "or" includes the conjunctive, the disjunctive and both (a or b thus includes either a or b, as well as a and b).

For purposes of a detailed discussion below, embodiments are described with reference to a storage service supported by a cloud computing platform, and further by way of example, the a cloud computing platform having a front end layer, partition layer, and stream layer. However, the methods described herein can be performed in different types of operating environments having alternate configurations of the functional components described herein. As such, the embodiments described herein are merely exemplary, and it is contemplated that the techniques may be extended to other implementation contexts.

A distributed storage system can be implemented as a cloud computing platform that runs cloud services across different data center and geographic regions. The cloud computing platform can implement a fabric controller component for provisioning and managing resource allocation, deployment/upgrade, and management of cloud services. Typically, a cloud computing system acts to store data or run service applications in a distributed manner. The service-application components (e.g., tenant infrastructure or tenancy) of the cloud computing system may include nodes (e.g., computing devices, processing units, or blades in a server rack) that are allocated to run one or more portions of a tenant's service applications.

When more than one separate service applications are being supported by the nodes, the nodes may be partitioned into virtual machines or physical machines that concurrently run the separate service applications, respectively, in individualized computing environments that support the resources and/or operating system specific to each service application. Further, each service application may be divided into functional portions such that each functional portion is able to run on a separate virtual machine. In cloud computing systems, multiple servers may be used to run service applications and perform data storage operations in a cluster. In particular, the servers may perform data operations independently but exposed as a single device referred to as a cluster. Each server in the cluster may be referred to as a node.

A storage service on the cloud computing platform can be a service supported using the fabric controller component. The storage service can be responsible for managing the replication and data placement across disks and load balancing the data and the application traffic with storage clusters. The storage service can be responsible for managing access to a high volume of storage. The storage service can implement a storage stamp as a cluster of N racks of storage nodes and a location service that manages the storage stamps. Specifically the location service can allocate location stamps and manage them across the storage stamps for disaster recovery and load balancing.

With reference to FIG. 1, the architecture 100 of a storage stamp, in a cloud computing platform 120 supporting a storage service, can include a front-end (FE) layer 122, a partition layer 124, and a stream layer 126 (or distributed file system layer). The FE 122 layer may be configured for receiving incoming requests from an application 110 or client. Upon receiving a request, the FE 122 can authenticate and authorize the request. The FE 122 can route the request to a partition server in the partition layer. In embodiments, the FE 122 maintains a partition map that keeps track of partition name ranges and which partition server is serving which partition names.

The partition layer 124 is responsible for managing and understanding high level abstractions of user files, structured storages, and messaging. The partition layer 124 also provides a scalable index, transaction ordering, and storing consistency for objects. The partition layer 124 can specifically support storing object data on top of the stream layer 126. In embodiments, the partition layer partitions data objects within a storage stamp.

The stream layer 126 stores bits on disk and supports replicating the data across many servers to keep data durable within a storage stamp. The stream layer 126 supports files called streams which are ordered lists of large storage chunks called extents. The stream layer stores and replicates extents. The data stored in the stream layer is accessible from the partition layer 124. The stream layer 126 may provide a file system namespace and an Application Programming Interface (API) for the partition layer 124 to perform writes. Writes can be append-only. The interface between the stream layer 126 and partition layer 124 allows a client to open, close, delete, rename, append to, and concatenate streams. A stream can refer to an ordered list of extent points and an extent is a sequence of append blocks. An extent can be a seal extent, such that, the extent can no longer be appended to. An application can read data from extents to access block contents of the extents.

The stream layer 126 can include a stream manager (not shown) and extent node (not shown). The stream manager is responsible for tracking the stream namespace, what extents are in each stream and the extent allocation across extent nodes. The stream manager performs lazy re-replication of extent replicas that are lost due to hardware failures or unavailability. Each extent node maintains the storage for a set of replicas assigned to the corresponding extent by the stream manager. Each extent node contains a view about the extents it owns and where the peer replicas are for a given extent.

A discussion of a suitable architecture of a distributed storage system for performing embodiments described herein is further described in described in U.S. Pat. No. 8,620,884, filed Oct. 24, 2008, and entitled "SCALABLE BLOB STORAGE INTEGRATED WITH SCALABLE STRUCTURED STORAGE," and Calder, Brad et al., "Windows Azure Storage, A Highly Available Cloud Storage Service with Strong Consistency" *SOSP '11 Proceedings of the Twenty-Third ACM Symposium on Operating Systems Principles,* 2011: Pages 143-157. Print, which both are incorporated herein, by reference, in their entirety.

A distributed storage system can support several different types of applications, from social networking to managing medical records. The distributed storage system can specifically be implemented with user files, structured storage, and message delivery in order to support storage and workflow of the applications. Specifically, a distributed storage system can be configured to receive transactions that facilitate the storage and workflow of the applications. The distributed storage system can implement a transaction-based log system where transactions are executed based on incoming requests. The transactions can be committed into memory, and upon committing the transactions into memory the transaction is then committed into disk. An acknowledgment of success is then communicated to the client. Conventionally, on-disk storage can be based on a single log stream system, with latency and throughput issues when appending a high volume of transactions to storage. Merely logging executed transactions multiple times and writing transactions to disk multiple times simply consumes additional resources in the distributed storage system. Moreover, with growing availability of flash-based storage systems, an increased expectation exists in high volume storage systems for consistent latency of requests and transactions to be performed. As such, the capacity of the distributed storage system to handle high volumes of transactions in an intelligent way can be critical to the overall performance of the distributed storage system.

Embodiments described herein provide simple and efficient methods and systems for implementing a distributed storage system with multiple transaction logs. At a high level embodiments described herein implement multiple transaction logs to provide higher aggregate bandwidth. Higher aggregate bandwidth yields increased transaction throughput and consistent latency. The increased throughput can be achieved by multiplexing write requests across different transaction logs. Consistent latency can be achieved by issuing write requests to different transaction log streams and committing the transaction as soon as the first acknowledgment of success returns.

Embodiments described herein also provide performance isolation based on request attributes such as of payload sizes and priorities. Additionally, the number of log streams can be dynamically adjusted to adapt to the traffic demand and the underlying system load conditions and to get optimal usage of the system resources. It is contemplated that embodiments can also support an adaptive retry mechanism to provide consistent latency and tolerate high latencies. Latency can be caused by several different factors. By way of example, operational characteristics of the storage service, such as sealing extents, can cause latencies and inconsistencies during write requests to the storage service. In this regard, the adaptive retry mechanism can be implemented with multiple transactions logs.

The multiple log stream system can be built on top of a durable layer of the distributed storage system architecture and operational attributes thereof. By way of example, a stream layer supports durable nodes and failure and recovery mechanisms. The multiple transaction log streams can be used for failure recovery during a failover. By way of example, if a partition server supporting incoming requests were to crash, recovering from the crash can be based on replaying the committed transactions from a plurality of log streams. Embodiments described herein improve the replay speed because the committed transactions are read from multiple transaction log streams in parallel with an increased amount of read bandwidth which delivers better performance.

Accordingly, in a first embodiment described herein, a system for implementing multiple log streams in a distributed storage system is provided. The system includes a stream component configured for: detecting performance metrics of a plurality of log streams, wherein the performance metrics are based on processing requests from partitions in a distributed storage system; and communicating performance metrics of the plurality of log streams. The system further includes a transaction component configured for: receiving a request to perform a transaction using a log stream of the distributed storage system, wherein the request is received from a partition of the distributed storage system; determining whether to identify a log stream using one or more of: a performance capacity scheme and a request attribute scheme.

Identifying the log stream using the performance capacity scheme comprises: accessing the performance metrics of the plurality of log streams, wherein the performance metrics indicate a performance capacity, of a selected log stream, to process the request; and selecting the log stream based on the performance capacity. Identifying the log stream using the request attribute scheme comprises: accessing the requesting attributes of the request, wherein the request attributes indicate a performance isolation trait for processing the request; and selecting the log stream based on the performance isolation trait. The stream component is further configured for: communicating the request to be executed using the log stream identified based on the performance capacity; and communicating the request to be executed using the log stream identified based on the performance isolation trait.

In a second embodiment described herein, one or more computer storage media having computer-executable instructions embodied thereon that, when executed, by one or more processors, causes the one or more processors to perform a method for implementing multiple log streams in distributed storage systems is provided. The method includes receiving a request to perform a transaction using a log stream of the distributed storage system. The request is received from a partition of the distributed storage system. The method also includes referencing performance metrics of the plurality of log streams. The performance metrics indicate a performance capacity, of a selected log stream, to process the request. The method further includes determining a log stream for processing the request based at least in part on the performance capacity. The method includes executing the request using the log stream identified based on performance capacity to perform the transaction.

In a third embodiment described herein, a computer-implemented method for implementing multiple log streams in a distributed storage system is provided. The method includes receiving a request to perform a transaction using a log stream of a distributed storage system. The request is received from a partition of the distributed storage system. The method includes determining two or more log streams for processing. The two or more log streams are selected for performing a multi-write operation. The method includes executing a first write operation for the request. The method further includes upon expiration of a threshold waiting time, executing a second write for the request. The method also includes communicating an acknowledgment to a client upon receiving acknowledgment of performance of the transaction of the request either from the first write operation or the second write operation.

Figure 2:
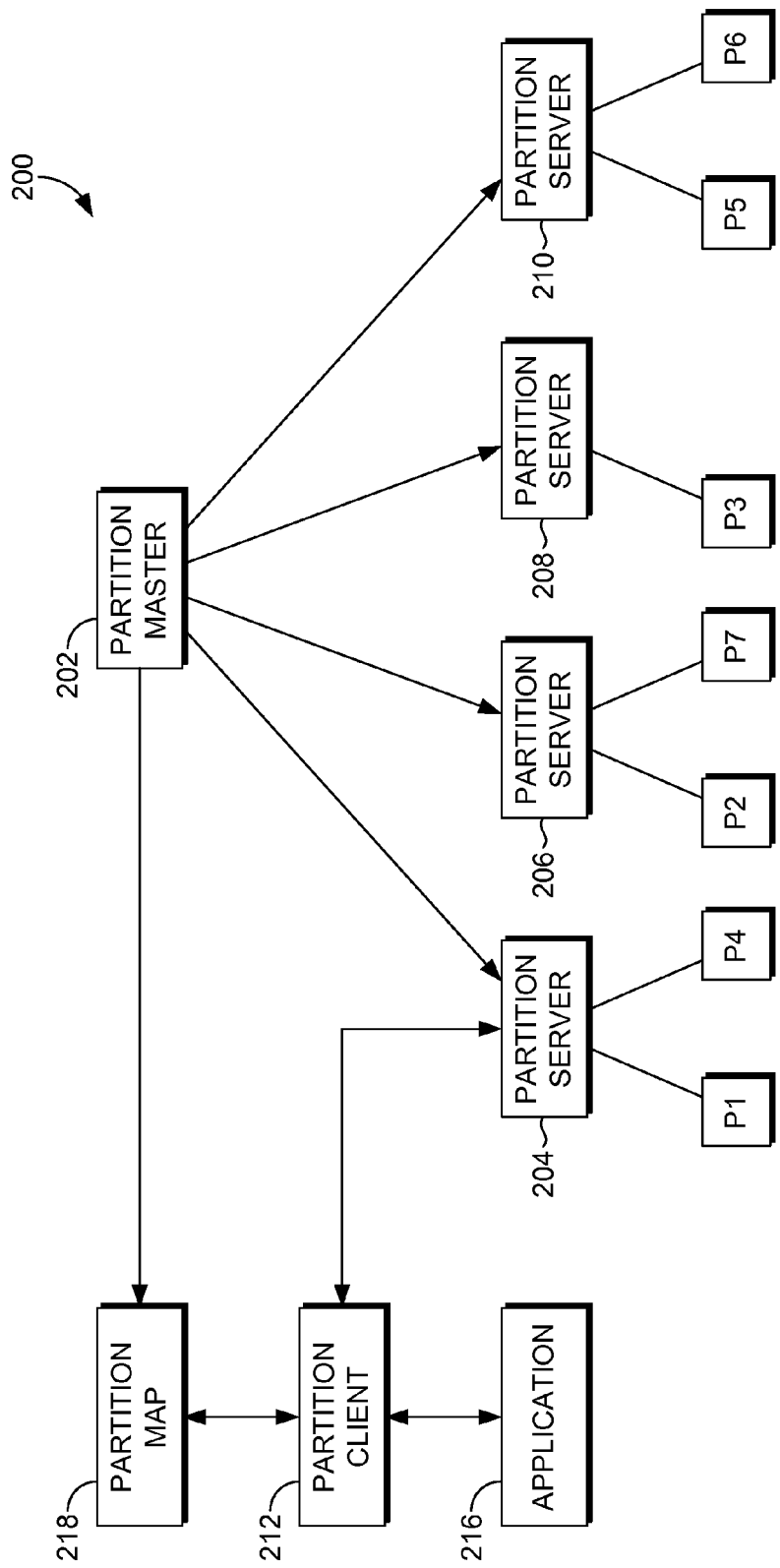
FIG. 2 is a block diagram of an exemplary distributed storage system in which embodiments described herein may be employed.

Referring now to FIG. 2, FIG. 2 illustrates an exemplary system in which implementations of the present disclosure may be employed. In particular, FIG. 2 shows a high level architecture of cloud computing system 200 in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, cloud computing system 200 includes master 202 (e.g. partition master 202), servers 204, 206, 208, and 210 (e.g. partition servers 204, 206, 208, and 210), and client 212 (e.g. partition client 212). Each may reside on any type of computing device, which may correspond to computing device 100 described with reference to FIG. 1, for example. The components of cloud computing system 200 may communicate with each other over a network, which may include, without limitation, one or more local area networks (LANs) and/or wide area networks (WANs). Although a single master, four servers, and a single client are shown in FIG. 2, any number of masters, servers, and clients may be employed within cloud computing system 200 within the scope of implementations of the present disclosure.

Stored data of scalable storage 200 is divided amongst a plurality of partitions. For example, scalable storage 200 can comprise a key space divided amongst the plurality of partitions. Master 202 is configured to assign the partitions to servers 204, 206, 208, and 210, and/or other servers of cloud computing system 200 not shown. Master 202 can also be configured to determine when a partition of the partitions is not hosted by any server due to a failure and reassign the partition to a different server. Master 202 is further configured to control load balancing of the partitions on servers 204, 206, 208, 210, and/or other servers of cloud computing system 200 not shown. Additionally, Master 202 is configured to monitor resource utilization with respect to any of the partitions and/or servers 204, 206, 208, and 210, and/or other servers of cloud computing system 200 not shown. It is further contemplated that master 202 is configured to support integrated resource allocation and load balancing in accordance with embodiments of the present invention, as discussed in more detail below.

In cloud computing system 200, the servers, such as servers 204, 206, 208, and 210 are utilized to store and provide access to a storage system, for example, a storage system. Master 202 is configured to manage the servers. Furthermore, client 212 is configured to provide applications, such as application 216, access to the storage system. Each server of cloud computing system 200, such as servers 204, 206, 208, and 210, can be responsible for providing read and write access to zero to many partitions assigned to the server. Furthermore, each of the partitions can be assigned to a single one of the servers. In the example shown in FIG. 2, server 204 is hosting partitions P1 and P4, server 206 is hosting partitions P2 and P7, server 208 is hosting partition P3, and server 210 is hosting partitions P5 and P6.

Client 212 is linked into an application, such as application 216. In some implementations client 212 is configured to issue commands to some of the partitions (e.g. partitions P1, P2, P3, P4, P5, P6, and P7) hosted by servers 204, 206, 208, and 210 and/or other servers of cloud computing system 200. Also in some implementations, client 212 may communicate with the application indirectly, for example, through a virtual IP and software load balancer or other means that directs communication requests to a front-end. The front-end can utilize a partition map, such as partition map 218, to determine which of the servers is hosting (mapped to) which of the partitions and can send commands to those servers. Results of the commands can be received back from the servers and can be passed to the application. The partition map stores mappings between the partitions and the servers they are assigned to, and can typically be maintained by a master, such as master 202.

Having described various aspects of cloud computing system 200, it is noted that any number of components may be employed to achieve the desired functionality within the scope of the present disclosure. Although the various components of FIG. 2 are shown with lines for the sake of clarity, in reality, delineating various components is not so clear, and metaphorically, the lines may more accurately be grey or fuzzy. Further, although some components of FIG. 2 are depicted as single components, the depictions are exemplary in nature and in number and are not to be construed as limiting for all implementations of the present disclosure.

Figure 3:
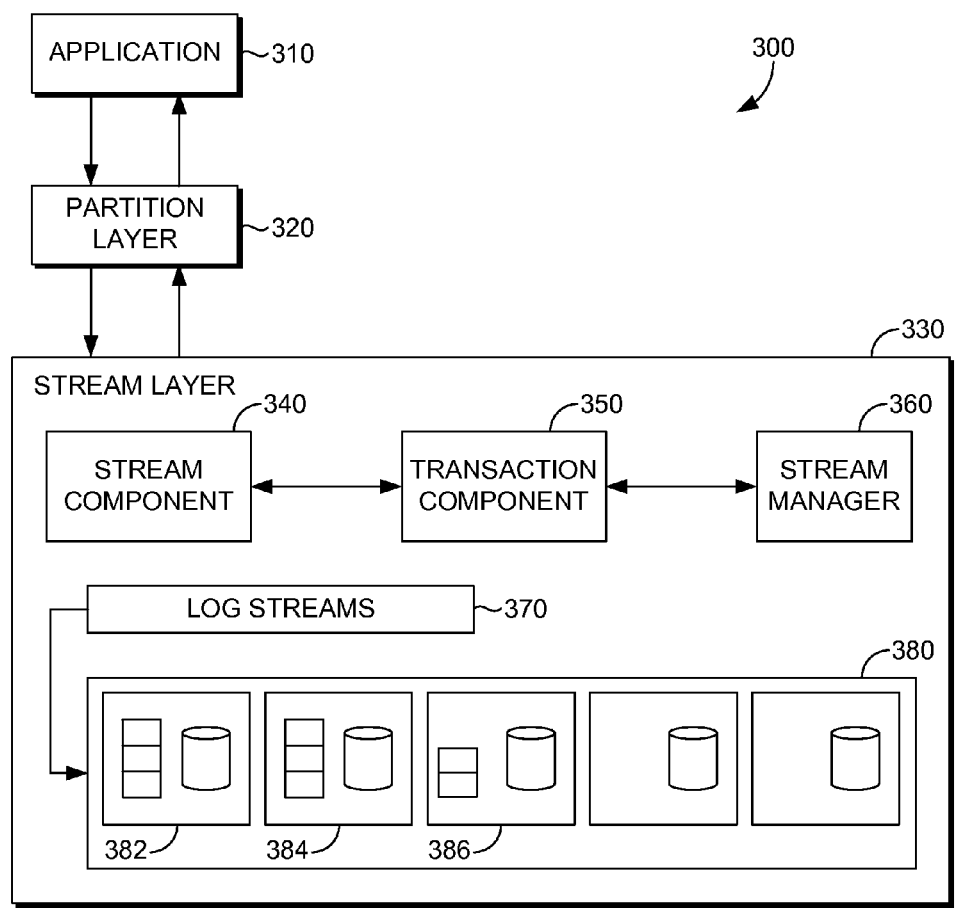
FIG. 3 is an exemplary operating environment for implementing multiple log streams in distributed storage systems, in accordance with embodiments described herein.

Turning now to FIG. 3, a block diagram depicting multiple transaction log distributed storage system 300 ("multiple transaction log system") in an operating environment suitable for use in implementing embodiments described herein is provided. Generally, the multiple transaction log system 300 may be used for, among other things, processing requests communicated to a storage service in a cloud computing platform, using a log stream intelligently selected from a plurality of log streams based on performance capacity.

Among other components not shown, the multiple transaction log system 300 may generally include application 310, partition layer 320, and a stream layer 330. The stream layer 330 further includes a stream component 340, transaction component 350, a stream manager 360 and log streams 370. In some embodiments, one or more of the illustrated components and/or modules may be implemented as stand-alone applications. In further embodiments, one or more of the illustrated components and/or modules may be implemented via a computing device, as an Internet-based service, and/or as a module within the cloud computing platform. It will be understood by those of ordinary skill in the art that the components and modules illustrated in FIG. 3 are exemplary in nature and in number and should not be construed as limiting.

Any number of components and/or modules may be employed to achieve the functionality described herein. For example, any number of partition layers and stream layers, and cloud computing platforms and components thereof and networks may be employed in the multiple transaction log system 100 within the scope of embodiments hereof. Each may comprise a single device/interface or multiple devices/interfaces cooperating in the development environment system 100. For instance, multiple devices and/or modules arranged in a distributed environment may collectively provide the server component described herein.

It should be understood that this and other arrangements described herein are set forth only as examples. Other arrangements and elements (e.g., machines, interfaces, functions, orders, and/or groupings of functions) can be used in addition to, or instead of, those shown, and some elements may be omitted all together. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions, including the functions described below with respect to the multiple transaction log system 300, may be carried out by a processor executing instructions stored in memory.

With continued reference to FIG. 3, during data flow, the partition layer 320 is responsible for processing incoming transactions. Conventionally, the partition layer 320 supports a single transaction log stream for different types of incoming transactions. The partition layer 320 uses a transaction log to persist the incoming transactions to a given partition. To ensure durability, all records have to be persisted to disk before a transaction is committed. Since transactions have to flush the log while committing, the bandwidth of the transaction log can limit the maximum transaction throughput. Further, consistency of the latency is also critical for reliable performance. As such an implementation of multiple log stream system improves on throughput and consistent latency.

The stream layer 330 responsible for supporting components that provide the functionality of the multiple log stream system. The stream layer is a layer below the partition layer that commits the transaction in memory and other persistent storage. Persistent storage can include disk storage or flash-based storage. The stream layer is advantageously positioned to track performance metrics of log streams and to determine a log stream for targeting particular requests. The functionality of the stream layer is presented herein as computing components, for clarity purposes, and not meant to be limiting.

The stream layer 330 can support append operations and sealing of extents. The append operations can be atomic, in that, the entire data block is appended or nothing is. An extent can have a target size, and when it fills up to that size, the extent is sealed at a block boundary, and then a new extent is added to the stream and appended continue into that new extent. A sealed extent is immutable.

In embodiments, when a stream is created, a stream manager 360 assigns three replicas for the first extent, (one primary 382 and two secondary 384 and 386) to the three extent nodes. The replicas can specifically be chosen to randomly spread the replicas across different fault domains and upgrade domains. The stream manager 360 decides which replica will be the primary extent. Writes to the extent from an application 310 may be performed to the primary EN 382, and the primary EN 382 is in charge of coordinating the write to two secondary ENs (384 and 386). As appends commit in order on a replica, the last append position is considered to the current commit length of the replica.

The stream manager 360 coordinates the sealing operation among the ENs. The stream manager 360 determines the commit length of the extent used for sealing based on the commit length of the extent replicas. Once the sealing is done, the commit length does not change. To seal an extent, the stream manager 360 can ask all three ENs their current length, During sealing, all replicas can have the same length which is the simple case, or a given replica is longer or shorter than another that may occur during an append failure. In the latter case, the stream manager 360 may be able to take remedial measures to seal the extent at the smallest commit length without data loss.

The stream component 340 is responsible for managing a plurality of log stream associated with the multiple transaction log system. Managing the streams includes maintaining a log stream index of log streams and generating a performance profile for each log stream based on performance metrics of the corresponding log stream. In one embodiment, the log stream index can be implemented using a metadata stream of the stream layer. Each stream corresponds to a record in the index with a plurality of fields for identifying information of the log stream and information associated with a performance profile of the log streams. For example, the index can include an identifier, a stream name, operation attributes, throughput attributes, and latency attributes. Other types of information for a log stream are contemplated with embodiments of the present invention.

The log stream index can indicate one or more partitions associated with a particular log stream. By way of example, the metadata stream (not shown) of a stream layer includes the log stream index that identifies each stream and corresponding one or more partitions using codes stored in the index. In one embodiment, during load of a partition, the stream component associates log streams with the partition such that traffic associated with the partition can be directed to the one or more streams.

In one embodiment, the stream component 340 can also be configured to manage a number of actual log streams and a number of active log streams. It is contemplated that a number actual log streams to a partition can be assigned at the time a partition is loaded and remains unchanged until the partition is offloaded and reloaded. The actual log streams can be identified in stream records of the log stream index. The stream component can dynamically adjust the number of active log streams of a partition. The stream component can maintain the dynamic configuration of the number of active log streams associated with a partition. The dynamic configuration of active logs streams can be adjusted. Adjusting the active log streams corresponding to a partition can be based on the load of the partition and/or also a performance profile of the log streams. In this regard, the partition can maintain two identifiers—NumLogStreams and NumActiveLogStreams. NumLogStreams designates the actual number of log streams and NumActiveLogStreams designates the subset of those to which new transaction records can be written.

Increasing the number of log streams can be based on the number read from the dynamic configuration being higher than the current actual number of log streams, both NumLogStreams and NumActiveLogStreams can be set to that value. A new stream record can be written and the new streams will get created during partition load with an Epoch record designating the current partition epoch. In addition, before the partition starts accepting new traffic, it may also write an updated Checkpoint record which is a copy of the last Checkpoint record from the previous instance but includes the new streams in the replay region set. This is so that if the partition writes some transactions to those streams and gets reloaded before a Checkpoint happens, the streams would still get replayed during the next partition load.

Decreasing the number read from dynamic configuration being lower than the current actual number of streams, then NumActiveLogStreams will be set to this number and NumLogStreams will be set to the current actual number of streams as specified in the stream record. If, at the partition load time, the last n log streams (where n is between 0 and NumLogStreams−NumActiveLogStreams) are completely empty, then those n streams will be deleted (and an updated stream record will be written) and NumLogStreams will be subtracted by n. A new epoch record will be written to all the remaining streams (including the inactive ones) and all of them which are present in the replay region set will be used for transaction replay.

The stream component 340 is responsible for developing a log stream performance profile for log streams. The stream component tracks performance metrics on the operation attributes, throughput attributes, and latency attributes of the log streams, such that, a particular log can be intelligently selected to improve throughput and consistent latency. Performance metrics can be based on resources which may include a physical resource or an abstract resource that facilitates the log stream in executing transactions associated with a request. By way of example, a physical resource may refer to CPU cycles, bandwidth, or memory and an abstract resource may refer to certain API calls to components of the cloud computing system.

Resource usage can also be classified under operation attributes, throughput attributes, or latency attribute. For example, an operation attribute can be based on whether a log stream is currently processing a write request that results in a transaction that performs an extent seal operation. A throughput attribute can be based on the current load of a log stream, such as, the payload size for particular requests. A latency attribute can be based on a time interval between a command and response, the delay between a cause and effect before observing a change in the system. Latency attributes can be associated with requests, requests during a particular interval, request that lead to specific operation, such as, sealing extents. Other variations and combinations, physical resources, abstract resources, log stream attributes are contemplated with embodiments described herein.

Performance metrics can be used to generate a retry window time period. The retry window can specify a time period for which to delay a retry of a particular request. The retry window can be dynamically implemented. The dynamic retry window is part of an adaptive retry scheme which can be based on quantiles. Quantiles refer to performance metrics taken at regular intervals that are bucketed into percentiles. The retry window for a request can be selected within a predefined percentile of a selected period of time. By way of example, performance metrics can be evaluated for a period of five minutes for a log stream, where an exemplary performance metric can be the latency of a set of requests to a log stream. The latency period within a selected percentile of requests (e.g., $95^{th}$ percentile) can be determined (e.g., 5 ms) and identified as the retry window. As such, during the next five minute period, any requests that take over 5 ms to perform the corresponding transaction will be communicated to another log stream without waiting for the previous request. Also during the next five minute period, the performance metrics collected can be used to determine the retry window for the next five minutes, and so on.

By way of another example, a distributed storage system that can serve millions of requests a second from all kinds of customers with very different workload, it can be common for the system to constantly have mini glitches throughout the system, such a TCP retransmission after packet drop, memory paging on some busy nodes, application threads being stalled due to lock contention or a sudden burst of requests hitting a particular node. The system performance always fluctuates. A typical performance quantiles for stream append across all log streams can be depicted below:

Latency quantiles: 25% at 1.12 ms, 50% at 1.23 ms, 75% at 1.47 ms, 90% at 1.81 ms, 95% at 2.13 ms, 98% at 3.89 ms, 99% at 5.03 ms, 99.5% at 6.12 ms, and 99.9% at 8.89 ms Usually the performance up to 90% is relatively consistent, while the higher end quantiles tend to vary a lot. With pre-determined latency threshold for retry, if the selected retry threshold is too low (say 1 ms in the above example), almost every request needs retry and total effective append throughput will suffer. If the selected retry threshold is too high (say 5 ms), retry will not be effective in achieving consistent append latencies.

Rather than pre-determine the latency threshold for retry, our system dynamically determines the latency threshold based on quantiles data, which are constantly being updated on predetermined time period (e.g., a few minutes) and reflected the most recent client-observed performance. It is further contemplated that the quantile algorithm can consider request size distribution, the latency quantile data may be based on similar-sized requests. The system picks a percentile (e.g., 95%) as the quantile threshold. In the above example, the system will use 2.13 ms as the retry window threshold. This statistical approach allows the system to promptly respond to the system performance change and not waste any retries, and avoids guessing the proper retry latency threshold. As such, other variations of a quantile-based dynamic retry window interval are contemplated with embodiments described herein.

A transaction component 350 is responsible for receiving and communicating requests for execution using log streams. Requests can initially be received from a client and communicated via the partition layer 320 to the stream layer having the transaction management component 350. Request can be associated with request attributes. A request attribute can refer to a property or status. A request attribute can also specifically refer to a characteristic of the request that implicates the performance capacity of a log stream selected to perform the request. The transaction component can be responsible for tracking request attributes. Attributes can include a priority level and a payload size. Request attributes can indicate a performance isolation metric (e.g., priority level—low, medium, high; payload (>10 mb) (<10 mb)) for dedicating particular log streams to requests. Other variations and combination of request attribute and performance isolation metrics are contemplated with embodiments described herein.

Figure 4:
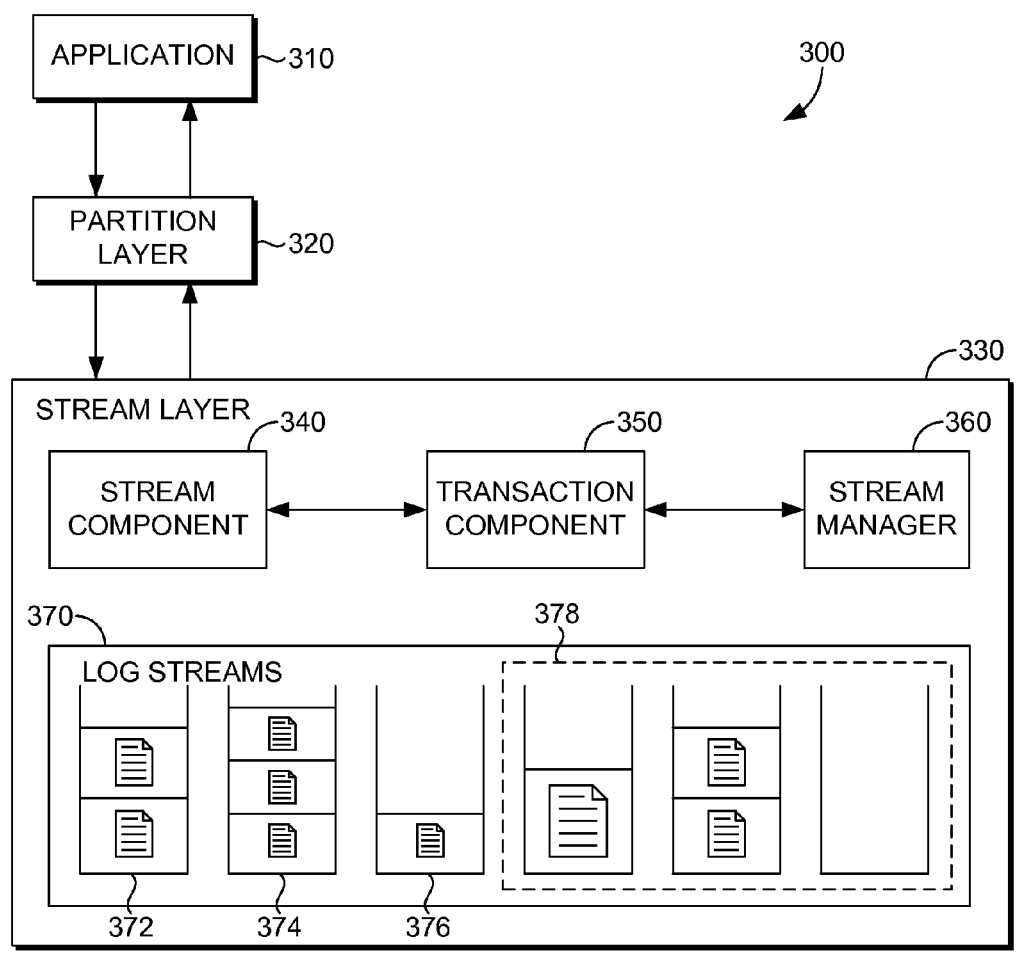
FIG. 4 is an exemplary operating environment for implementing multiple log streams in distributed storage systems, in accordance with embodiments described herein.

With reference to FIG. 4, conventionally, all requests (e.g., a write request) would be written to a single stream; however, with multiple log streams (e.g., 372, 374, and 376), requests can be executed on different logs streams. In operation, when the transaction component 350 receives a write request, the write request can be assigned a log stream. A partition associated with the request can already be associated with at least two log streams by the stream component 340. The transaction component 350 can execute incoming requests on one of the log streams. In one embodiment, the transaction component 350 implements stream groups (e.g., stream group 378). A single handle that encompasses a group of individual streams is exposed to the partition layer. As such, a write request from the partition layer is issued against a group handle such that the stream layer internally executes the write request on one of the log streams in a stream group using a single handle. A group handle can include two or more log streams. The stream groups can specifically be used for multi-write-wait-retry scheme or a multi-write-parallel-write scheme, described in more detail below.

The transaction component 350 can be responsible determining how the request is executed on the log streams. In particular, the transaction component can define several transaction schemes for executing the requests on log streams. Transaction schemes can be based on the request attributes and/or performance profiles of a log streams referenced from the stream component. By way of example, a write may have a payload above a threshold amount, such that, a dedicated log stream exists for processing the request to perform the transaction. Also a write request can be executed on a selected log stream, where the log stream is selected because the load on the log stream is low. The load of the log stream can be determined using a performance profile of the log stream; the performance profile includes tracked performance metrics of the log streams.

The transaction component 350 is also responsible for multi-write transactions. A multi-write transaction refers to issuing a write to multiple log streams. By way of example, a write request having a high priority property can be executed on multiple log streams in parallel with additional processing performed on the transaction that is completed first. In one embodiment, the transaction component 350 can implemented as multi-write based on a wait and retry logic. The transaction component 350 can execute a first write for the write request, then wait for a predefined period of time and if the write has not been completed, the transaction component can issue a second write for the write request on a second stream. It is contemplated that the predefined period can be based on a retry window generated using quantiles. The transaction component continues with processing based on the write the finishes first, any one of the first write or second write.

Advantageously, the transaction component is implemented in the stream layer such that the transaction component can additionally reference a performance profile of log streams in intelligently selecting log streams for executing write requests. As such, a multi-write transaction limits log stream latency spikes. It is contemplated that a request to cancel the write request that is not completed in order to preserve system resources or the creation of duplicate records. Moreover, duplicate records can be handled based on the sequence identifiers and ack identifiers association with transaction committed to memory and persistent storage.

The transaction component 350 can reference performance metrics of a log stream performance profiles to determine a performance capacity of log streams. With reference to FIG. 4, log stream 372, 374, and 376 can each correspond to different performance capacities after evaluation of one or more performance metrics. As such, a particular log stream can be selected over another log stream for execution a request. The performance capacity can refer to the potential ability of the log stream to perform the transaction associated with request. The performance capacity can be based on operation attributes, throughput attributes, and latency attributes that are determined based on resources of a log stream. By way of example, an operation attribute of the log stream is whether or not the log stream in performing an extent seal operation. As such, the resource associated with an extent seal operation can be quantified, and as such, a log stream performing an extent seal operation would have a lower performance capacity than a log stream not performing an extent seal operation.

A throughput attribute can refer to the rate at which requests are processed. The throughput for each log stream can be quantified as a performance metric. By way of example, log stream 362 may have a quantified rate of 1 request per 10s and log stream 364 may have a rate of 1 request per 2s. With the current queue of requests, log stream 362 will be available to handle another request in 20s while log stream 364 will be available to handle another request in 6s. As such, with the transaction component 350 evaluating the performance capacity based on performance metrics prior to communicating a request for execution on log stream, the log stream with a better performance capacity—log stream 364—can be intelligently selected for processing requests.

Moreover, several different types of performance delays (e.g., append delay, extent sealing delay, or network delay) associated with functionality of the distributed storage system can impact performance of the of the log system. As such, the determining a performance capacity can further be based on quantifying resources associated with a particular type of performance delay in evaluating the log stream for executing a particular request. A common stall for appending to a stream is the stream layer performing a seal to the last extent and adding a new extent to the stream, a seal extent operation. This step involves stream manager and usually takes tens to over 100 ms or occasionally much longer. Multiple parties in the system can trigger the extent seal operation.

In multi-log-stream implementation, extent seal operation can be proactively triggered by the stream layer that does the actual append. In this way stream layer is aware that a stream is not "append-able" during the extent seal operation and thus exclude incoming requests to the stream while it goes through the extent seal operation. Also stream component can exclusively trigger the extent seal operation after the stream layer has removed all append requests from the target stream.

In addition, after an extent is added to the stream, the initial append to the new extent might take longer since the TCP connections among the storage nodes hosting the new extent instances may need to be established on demand or the storage nodes need to open some on-disk files. Rather than sending new user append requests to a newly created extent immediately, stream layer first sends an internal probe append request to the newly created extent, making sure everything along its append path is in good condition. After this probe request completes successfully, stream client library considers the new extent is append-able and starts sending user traffic.

By way of another example, a network stack can cause a network delay, in that, network links drop packets that necessitate retrying a request to other log streams. The impact on the network delay on a log stream can be quantified and factored in the performance capacity, which is used in selecting a particular log stream. It is contemplated that one or more performance metrics can be used in selecting log streams. It is also contemplated that performance metrics alone or in combination with other log stream selection schemes described herein can be used in selecting a log stream.

Embodiment described herein can also detect and avoid hot spots. A typical stream layer writes to multiple log steams concurrently and each stream writes to 3 storage nodes, as discussed herein. All these write requests return their load metrics of the hosting node and target device. These metrics are aggregated by the stream layer. If stream layer finds out one device or storage node has way more load compared with its peers in the system, the stream layer can decide to seal the extent, thus reducing the hot spots.

The transaction component 350 can further be responsible for replaying transaction records committed to a log stream. Replaying transactions can be performed during a partition load based on partition movement (e.g., partition load balancing). Partition loads can be performed upon system failure or a server crash during a recovery operation. Partition loads may also be performed by routine partition or mode load balancing activity As such, transaction records committed to log streams can be replayed to recover data onto the partition. A checkpoint record can be used to determine which regions to replay from each log stream. The replay component maintains a commit ordering of transactions across the log streams. The replay component uses a sequence identifier and ack identifier. The sequence number is unique across all log streams. The ack identifier corresponds to a transaction when the transaction has been committed in persistent storage.

Sequence identifiers can be used to order the transaction records read from the log stream. In order to maintain high performance when writing the records to the log stream, the writes are not serialized but instead a sequence identifier can be written with each transaction record. During a replay operation, the transactions are replayed in their original order, and this ordering is achieved by replaying the log records in the order of their sequence numbers instead of their physical stream order. When writing the log records, an ack identifier is also written with each record. The ack identifier indicates that all records with sequence identifer below it have already been written to persistent storage (e.g., disk or flash storage) and therefore there would not be any records after the current record which have a sequence identifier less than the ack identifier. This allows replay to move forward in the presence of holes in the sequence identifier space.

In the case of multiple log streams, the transaction records from different log streams also need to be replayed in the original transaction serialization order. In order to achieve this, there is a single sequence/ack identifier space shared across all the streams. This way the records across different streams can also be ordered using their sequence numbers. There can exist a separate log reader for each of the logs. The log reader can return transaction records in the order of their sequence numbers within that log. The output from all the log readers may be fed into a single priority queue which will then correctly order the records across all the logs. Also note that the aforementioned ack identifier property that no records with lower seq identifier will be observed after that holds for a single log stream, but it may not necessarily be the case when looking at records read from different log streams.

By way of example, consider two log streams with the following records. [x,y] below represents a record with seq x and ack y Log 1: [4,0] [1,1]
Log 2: [3,0] [2,4]
The output from the log readers would be:
Log Reader 1: [1,1] [4,0]
Log Reader 2: [2,4] [3,0]
The output from the priority queue will be: [1,1] [2,4] [3,0] [4,0] which is the order in which these records will be replayed.

The transaction records from each of the logs streams can be read and replayed. A priority queue can be implemented to provide the records in order of the log sequence numbers, thus maintaining the proper ordering during replay. It is contemplated that the partition may simultaneously continue to receive new requests from a plurality of log streams while replaying committed log transactions. As discussed above, the transaction component is responsible for maintaining a sequence identifier and an ack identifier. The sequence identifier indicates an ordering of communicated requests for transactions to be performed using the log stream. The ack identifier indicates that a transaction associated with a request has been committed to persistent storage. The sequence identifier and the ack identifier can in combination support replaying transactions. For example, imagine 2 log streams, a first log stream and a second log stream. The first log stream can be way faster than the second log stream. A first set of requests are communicated to the first log stream, the faster log stream, and second set of requests to the second log stream, the slower log stream. The first log stream will process the requests more quickly than the second log stream. However, the second log stream is still responsible for processing the second set of requests, even though at a slower rate.

The ack identifier is tracked for all streams. The ack identifier can designate a high water mark indicating the highest sequence identifier that has reached all log streams. Because the ordering of request as tracked using a sequence identifier can include gaps in certain implementations, the ack identifier is instead used for ordering the requests without gaps. The ack identifier can be used during replay such that the replay operation can be performed in an ordered sequence. In particular, when a sequence identifier is absent from all replay streams during a replay operation reading from the log streams, the replay operation can keep reading forward in all the streams to look for the sequence identifier. However, when an ack identifier with a number higher than the sequence number is identified after reading all logs streams, this indicates that that the absent sequence identifier cannot be in any log stream. As such, the sequence identifier is skipped and the next highest sequence identifier is replayed.

Figure 5:
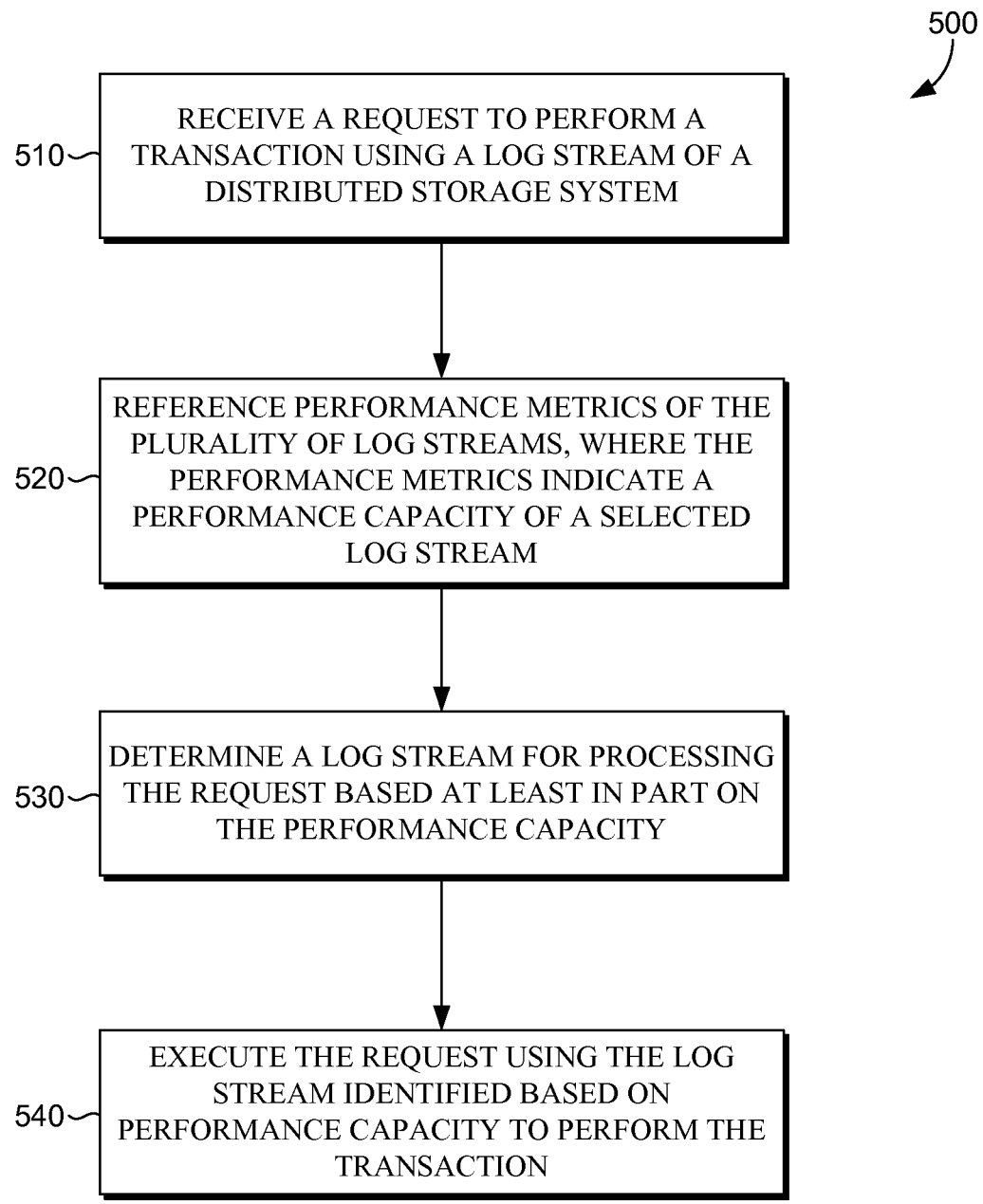
FIG. 5 is a flow chart showing an exemplary method for implementing multiple log streams in distributed storage systems, in accordance with embodiments described herein.

With reference to FIG. 5, a flow diagram that illustrates an exemplary method 500 for implementing multiple log streams in a distributed storage system is provided. At block 510, a request to perform transaction using a log stream of the distributed storage system is received. The request is received from a partition of the distributed storage system. At block 520, the performance metrics of the plurality of log streams are referenced or received. The performance metrics indicate a performance capacity of a selected log stream to process the request. At block 530, a log stream for processing the request is determined based at least in part on the performance capacity. At block 540, the request is executed using the log stream identified based on performance capacity to perform the transaction.

Figure 6:
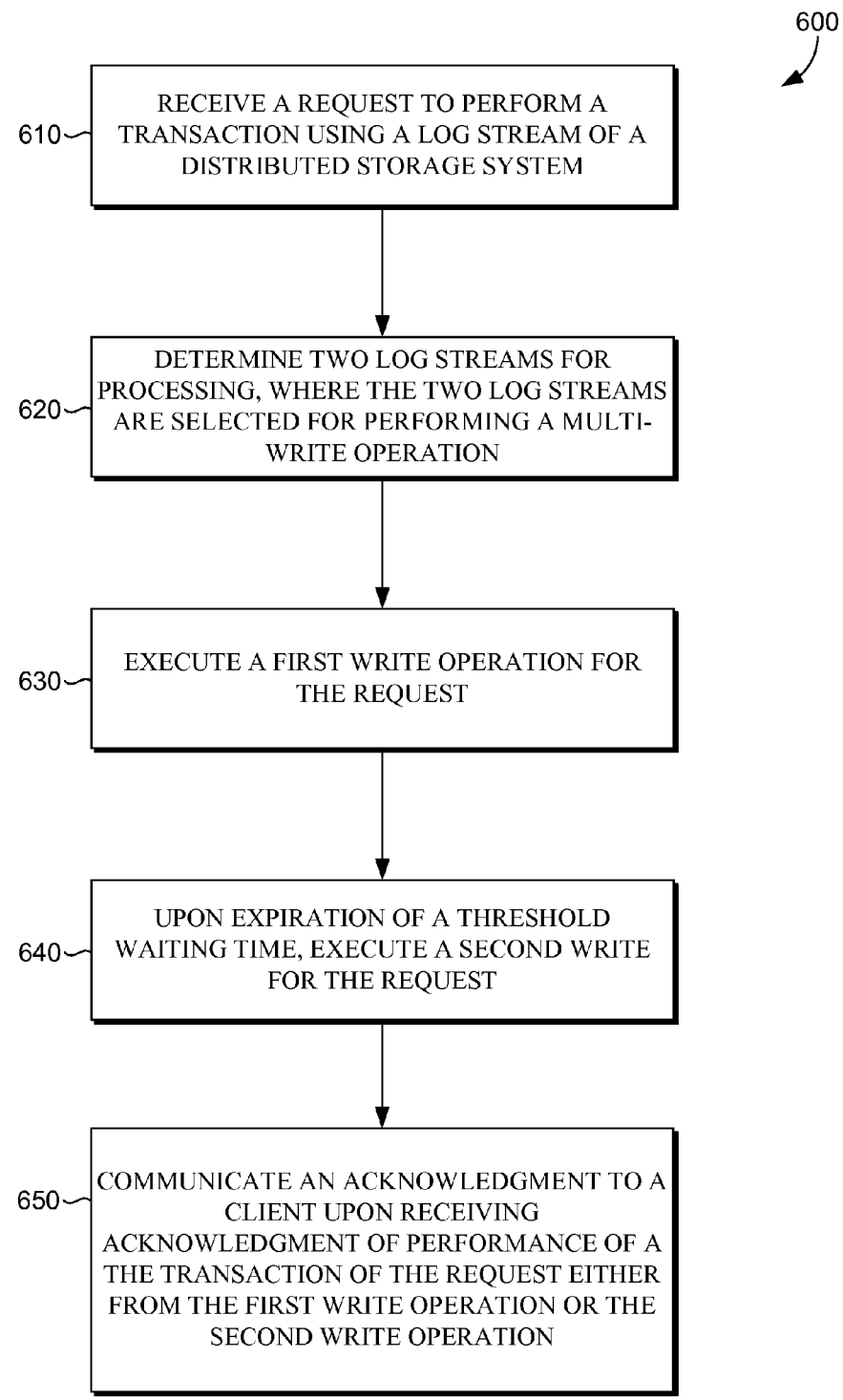
FIG. 6 is a flow chart showing an exemplary method for implementing multiple log streams in distributed storage systems, in accordance with embodiments described herein.

With reference to FIG. 6, a flow diagram that illustrates an exemplary method 600 for implementing multiple log streams in a distributed storage system is provided. Initially at block 610, a request to perform a transaction using a log stream of a distributed storage system is received. The request is received from a partition of the distributed storage system. At block 620, two or more log streams for processing the request are determined. The two or more log streams are selected for performing a multi-write operation. At block 630, a first write operation for the request is executed. At block 640, upon expiration of a threshold waiting time, a second write for the request is executed. At block 650, an acknowledgment to a client is communicated upon receiving acknowledgment of performance of the transaction of the request either from the first write operation or the second write operation.

Having briefly described an overview of embodiments of the present invention, an exemplary operating environment in which embodiments of the present invention may be implemented is described below in order to provide a general context for various aspects of the present invention. Referring initially to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Figure 7:
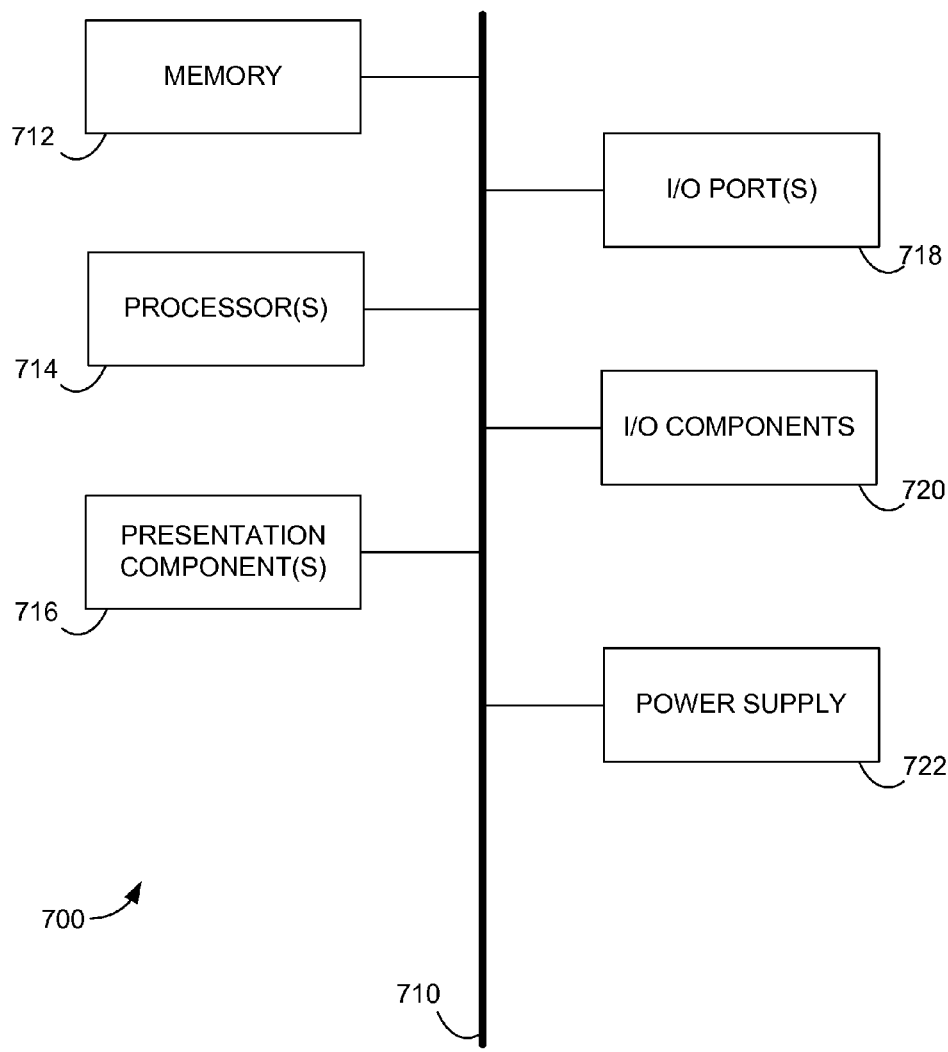
FIG. 7 is a block diagram of an exemplary computing environment suitable for use in implementing embodiments described herein.

With reference to FIG. 7, computing device 700 includes a bus 710 that directly or indirectly couples the following devices: memory 712, one or more processors 714, one or more presentation components 716, input/output ports 718, input/output components 720, and an illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 7 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A system for implementing multiple log streams in distributed storage systems, the system comprising:
   one or more hardware processors and memory storing computer-executable instructions and components embodied thereon that, when executed, by the one or more hardware processors, causes the hardware processors to execute:
   a stream component configured for:
   detecting performance metrics of a plurality of log streams,
   wherein the performance metrics are based on processing requests from a partition layer that supports partitions and corresponding partition servers in a distributed storage system,
   wherein a partition map stores a mapping between partitions and corresponding partition servers; and
   communicating performance metrics of the plurality of log streams;
   a transaction component configured for:
   receiving a request to perform a transaction using a selected log stream of the distributed storage system,
   wherein the request is received from a partition of the distributed storage system,
   wherein the partition layer operates with a stream layer comprising the plurality of log streams,
   wherein the partition layer supports persisting transactions in the plurality of log streams, in association with a corresponding partition, prior to commitment of the transactions, and
   wherein the stream layer provides a file system namespace for processing requests;
   determining, based on the request, whether to identify a log stream from the plurality of log streams, for executing the request, using one or more of: a performance capacity scheme associated with performance metrics and a request attribute scheme associated with performance isolation traits;
   identifying the log stream using the performance capacity scheme, wherein identifying the log stream using the performance capacity scheme comprises:
   accessing the performance metrics of the plurality of log streams, wherein the performance metrics indicate a performance capacity, of each log stream of the plurality of log streams, to process the request; and
   selecting the log stream based on the performance capacity;
   identifying the log stream using the request attribute scheme, wherein identifying the log stream using the request attribute scheme comprises:
   accessing the request attributes of the request, wherein the request attributes indicate a performance isolation trait for processing the request; and
   selecting the log stream based on the performance isolation trait;
   communicating the request to be executed using the log stream identified based on the performance capacity; and
   communicating the request to be executed using the log stream identified based on the performance isolation trait.

2. The system of claim 1, wherein the stream component is further configured for:
   generating a log stream index for the plurality of log streams; and
   generating a performance profile for the plurality of log streams, wherein the performance profile includes at least one of: operation attributes, throughput attributes and latency attributes for the plurality of log streams.

3. The system of claim 1, wherein the transaction is committed in the log stream and committed in a persistent storage component.

4. The system of claim 1, wherein the stream component is further configured for:
   tracking a number of actual log streams and a number of active log streams; and
   dynamically adjusting the number of actual log streams and the number of active log streams based on a dynamic configuration, wherein the dynamic configuration of the log streams is based on a corresponding partition.

5. The system of claim 1, wherein the transaction component is further configured for communicating the request to be executed as a single-write operation or a multi-write transaction, wherein executing a multi-write operation comprises:
    determining two log streams for processing;
    executing a first write operation for the request;
    upon expiration of a threshold waiting time, executing a second write for the request; and
    communicating an acknowledgment to a client upon receiving acknowledgment of performance of the transaction of the request either from the first write operation or the second write operation.

6. The system of claim 1, further comprising the transaction component configured for:
    determining a performance capacity of a log stream using a performance profile of the log stream, wherein the performance capacity is based on a plurality of resources associated with at least one of operation attributes, throughput attributes, or latency attributes.

7. The system of claim 1, wherein the request attributes include at least one of: a priority level and a payload size, and wherein at least one of the plurality of log streams operates as a dedicated log stream to requests having a performance isolation trait based on the priority level or the payload sizes.

8. The system of claim 1, wherein the transaction component is further configured for replaying committed transaction logs, wherein replaying committed transaction logs comprises:
    receiving an indication of a partition load;
    referencing a checkpoint record, wherein the checkpoint record indicates a region from which a replay operation can be performed; and
    referencing at least one of a sequence identifier and ack identifier to replay committed transaction logs on a partition, wherein replay of the committed transaction logs maintains an ordered sequence of committed transactions.

9. The system of claim 8, wherein the partition load is based on one of: a partition movement operation and a failure recovery operation.

10. One or more computer storage hardware memory having computer-executable instructions embodied thereon that, when executed, by one or more processors, causes the one or more processors to perform a method for implementing multiple log streams in distributed storage systems, the method comprising:
    receiving a request to perform a transaction using a selected log stream of a plurality of log streams of a distributed storage system, wherein the request is received from a partition layer that supports partitions and corresponding partition servers of the distributed storage system,
    wherein a partition map stores a mapping between partitions and corresponding partition servers,
    wherein the partition layer operates with a stream layer comprising the plurality of log streams,
    wherein the partition layer supports persisting transactions in the plurality of log streams, in association with a corresponding partition, prior to commitment of the transactions,
    wherein the stream layer provides a file system namespace for processing requests;
    referencing both performance metrics of the plurality of log streams and one or more request attributes of the request,
    wherein the performance metrics indicate a performance capacity, of the selected log stream, to process the request and the one or more request attributes indicate a performance isolation trait for processing the request;
    determining a log stream for processing the request based at least in part on the performance capacity and the performance isolation trait; and
    executing the request using the log stream identified based on performance capacity and the performance isolation trait.

11. The memory of claim 10, wherein the request corresponds to the transaction having a sequence identifier and an ack identifier, wherein the ack identifier indicates the transaction successful performed an append operation to persistent storage.

12. The memory of claim 10, wherein at least one of the plurality of log streams operates as a dedicated log stream to requests having a performance isolation trait based on the priority level or the payload sizes.

13. The memory of claim 10, wherein determining the performance capacity is based at least in part on quantifying resources associated an identified performance delay, wherein a performance delay includes one of: an append delay, an extent sealing delay, or an network delay.

14. The memory of claim 10, wherein the performance metrics are based on processing requests from partitions using log streams from the plurality of log streams.

15. The memory of claim 10, further comprising:
    detecting expiration of a retry window, wherein the retry window indicates a delay time period for re-executing the request; and
    re-executing the request on a different log stream.

16. The memory of claim 15, wherein the retry window is a quantile-based determination using performance metrics, wherein the retry window is defined as a function of a predefined percentile of a selected period of time.

17. A computer-implemented method for implementing multiple log streams in distributed storage systems, the method comprising:
    receiving a request, from a partition layer of a distributed storage system, to perform a transaction using two or more log streams of a plurality of log streams of the distributed storage system,
    wherein the transaction is performed using a selected two or more log streams of the distributed storage system,
    wherein the partition layer supports partitions and corresponding partition servers of the distributed storage system,
    wherein a partition map stores a mapping between partitions and corresponding partition servers,
    wherein the partition layer operates with a stream layer comprising the plurality of log streams,
    wherein the partition layer supports persisting transactions in the plurality of log streams, in association with a corresponding partition, prior to commitment of the transactions, and
    wherein the stream layer provides a file system namespace for processing requests,
    determining the two or more log streams for processing, wherein the two or more log streams are selected for performing a multi-write operation, wherein the two or more log streams are determined based on referencing both the performance metrics of the plurality of log streams and one or more request attributes of the request,
    wherein the performance metrics indicate a performance capacity, of a selected log stream, to process the request and the request attributes indicate a performance isolation trait for processing the request;

executing a first write operation for the request;

upon expiration of a threshold waiting time, executing a second write for the request; and communicating an acknowledgment to a client upon receiving acknowledgment of performance of the transaction of the request either from the first write operation or the second write operation.

18. The method of claim 17, wherein determining the selected two or more log streams for processing the request is based on accessing the performance metrics of the plurality of log streams, wherein the performance metrics indicate a performance capacity, of a selected log stream, to process the request, wherein the performance metrics are based on processing requests from partitions using log streams from the plurality of log streams.

19. The method of claim 17, wherein the two or more log streams are implemented using a stream group, wherein the stream group includes at least two log streams exposed as a single handle to a partition.

20. The method of claim 17, further comprising:

upon receiving the acknowledgement of the performance of the transaction, communicating a request to cancel either the first write or the second write, wherein the first write or the second write does not correspond to the acknowledgment of performance of the transaction.

* * * * *